United States Patent [19]

Mikelsaar

[11] Patent Number: 4,622,014
[45] Date of Patent: Nov. 11, 1986

[54] THREE-DIMENSIONAL MODEL OF MOLECULAR STRUCTURE
[75] Inventor: Raik-Khiio N. Mikelsaar, Tartu, U.S.S.R.
[73] Assignee: Tartusky Gosudarstvenny Universitet, Tartu, U.S.S.R.
[21] Appl. No.: 798,695
[22] PCT Filed: Apr. 18, 1985
[86] PCT No.: PCT/SU84/00021
  § 371 Date: Nov. 8, 1985
  § 102(e) Date: Nov. 8, 1985
[87] PCT Pub. No.: WO85/04745
  PCT Pub. Date: Oct. 24, 1985
[51] Int. Cl.[4] .............................................. G09B 23/26
[52] U.S. Cl. ................................................. 434/278
[58] Field of Search ........................ 434/277, 278, 279

[56] References Cited
U.S. PATENT DOCUMENTS
3,091,870 6/1963 Sangster .......................... 434/278 X
3,183,608 5/1965 Jierree ................................ 434/278

FOREIGN PATENT DOCUMENTS
2951568 11/1981 German Democratic Rep. ..................... 434/278

Primary Examiner—Harland S. Skogquist
Attorney, Agent, or Firm—Burgess, Ryan & Wayne

[57] ABSTRACT

The three-dimensional model of a molecular structure comprises plastic modules (1) interconnected by connecting members (2). Each module (1) has an element (6) of an X-ray contrast material at its center, and an insert (7), also of an X-ray contrast material, extends axially of each connecting member (2).

1 Claim, 6 Drawing Figures

THREE-DIMENSIONAL MODEL OF MOLECULAR STRUCTURE

TECHNICAL FIELD

The invention relates to scientific appliances and educational aids, and more particularly it relates to a three-dimensional model of a molecular structure.

PRIOR ART

Three-dimensional models of molecular structures in the form of spheres with cutaway surfaces, connectable to one another by means of attachment units, offer obvious advantages over so-called skeleton models in the form of bars connectable at various angles. The dense consistency of the modules ensures that in modeling various conformation states of a molecular structure with the use of three-dimensional modules, proper ratios of Van der Waals' and covalent radii are retained. The intimate contacts of the spheres along the intersection surfaces enables these models to retain the inherent capacity of modeling valence angles and directions of imitated chemical bonds.

There is known a three-dimensional model of a molecular structure, comprising solid plastic modules with cylindrical openings for affixing these modules. The connecting members in the form of rods have projections or lugs, and complementing recesses are provided in the surfaces of the openings (cf. U.S. Pat. No. 3,452,452; Cl. 35-18, dated 1969). The openings in these modules have relatively sharp edges which do not provide for snug fitting of the rods. Furthermore, these models are unsuitable for studies with the use of X-rays as the latter easily penetrate the plastic.

There is further known a three-dimensional model of a molecular structure, comprising plastic modules representing each one atom of the molecular structure being modeled. The modules are shaped as spheres, semispheres, ellipsoids or polyhedrons wherein parts of the surfaces may be cut away. The elements interconnecting the modules, receivable in the sockets of the model, have surfaces of the same shape as the sockets. Thus, they may be shaped as two truncated cones interconnected by their larger bases. The peripheral surface of the cones is provided with grooves adapted to engage behind stepped lugs in the sockets of the modules when the latter are interconnected (cf. U.S. Pat. No. 3,170,246; Cl. 35-18, dated 1965). The connecting rods may alternatively be of a cylindrical shape.

However, these models are likewise unsuitable for studies with the use of X-rays, as both the modules and their connecting rods are made of plastics easily penetrated by X-rays, which means that a model cannot be employed for precise determination of the atomic coordinates, or else for comparison with electronic densitograms for quantitative evaluations.

DISCLOSURE OF INVENTION

The object of the invention is to create a three-dimensional model of a molecular structure which should provide for its employment for making X-ray photographs.

This object is attained in a three-dimensional model of a molecular structure, comprising plastic modules imitating each one atom of the molecular structure being modeled, interconnected by connecting members of a cylindrical shape, receivable in the sockets of each module, the shape of these sockets complementing the shape of the connecting member, in which model, in accordance with the invention, each plastic module has arranged centrally thereof an element shaped as a sphere or a part of a sphere, and each connecting member includes an insert extending axially thereof, the spherically-shaped element and the insert being made of an X-ray contrast material to produce on an X-ray photograph of the model the images of the centres of the plastic modules and representation of the chemical bonds of the modeled molecular structure.

SUMMARY OF THE DRAWINGS

The present invention will be further described in connection with embodiments thereof, with reference being made to the accompanying drawings, wherein.

PREFERRED EMBODIMENT OF THE INVENTION

The three-dimensional model of a molecular structure comprises interconnected plastic modules 1 (FIGS. 1 and 2) representing each one atom of the modeled molecular structure. The modules 1 are shaped as semispheres, polyhedrons, ellipsoids, and any one of them may have some of its surfaces cut away. The radius of a module corresponds to the Van der Waals' radius of the respective atom, and the distance between the centre of the module to its cutaway or section surface corresponds to the covalent radius of the atom.

Figure 2:
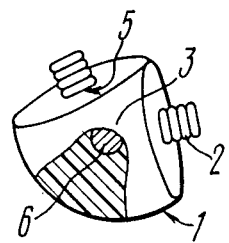
FIG. 2 is a partly sectional perspective view of a module of a three-dimensional model embodying the invention.
Figure 3:
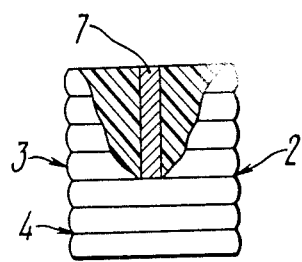
FIG. 3 is a partly sectional view of a connecting member of a three-dimensional model embodying the invention.

The modules 1 are interconnected by connecting members (FIG. 3) in the form of cylindrical rods 2 having projections 3 and recesses or valleys 4 on their peripheral surface, defining jointly a surface which may be called wave-shaped. Each module 1 (FIGS. 1 and 2) has openings made therein in the form of sockets 5 having on their surfaces projections and valleys complementary to the corresponding elements of the surfaces of the connecting members 2.

Each module 1 is provided at its centre with an element 6 (FIG. 2) shaped as a sphere or as a part of a sphere, and each rod 2 has an insert 7 (FIG. 3) extending centrally and axially thereof. The element 6 and the insert 7 are made of an X-ray contrast material, e.g. metal.

Figure 1:
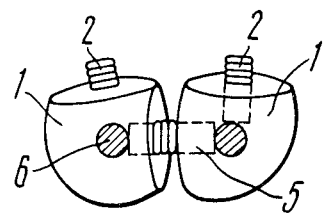
FIG. 1 is a general perspective view of a part of a three-dimensional module embodying the invention.
Figure 4:
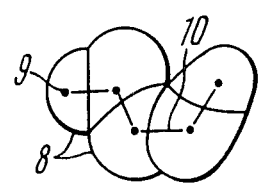
FIG. 4 illustrates an X-ray photograph of a three-dimensional model embodying the invention.

When an X-ray photograph is made in any known way of a three-dimensional model constructed as shown in FIG. 1, this photograph would present, in addition to the outlines 8 (FIG. 4) of the model, the images 9, 10 of the elements 6 (FIG. 2) and inserts 7 (FIG. 3), respectively, the images 9 representing the centres of the atoms, and the images 10 their chemical bonds.

Figure 5:
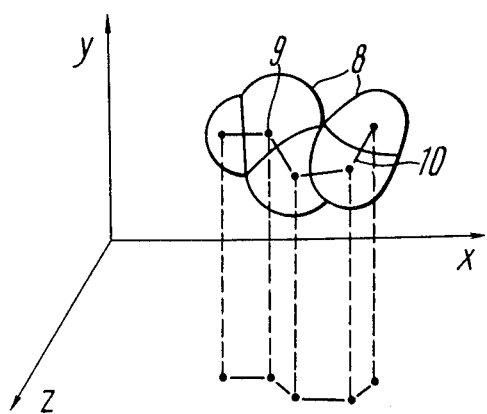
FIG. 5 illustrates a chart for determining atomic coordinates.

An X-ray photograph obtained is preferably arranged in reference to coordinate axes X, Y and Z (FIG. 5), which allows for determining the atomic coordinates. It can be seen that it is advantageous that the geometrical dimensions of the elements 6 and inserts 7 should be relatively small, so as to avoid distorting the reference points for measurements and having some of the elements shading out the others.

Figure 6:
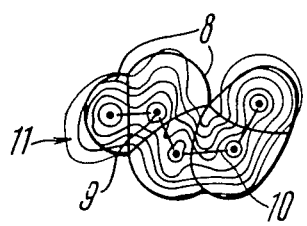
FIG. 6 schematically illustrates comparison between an X-ray contrasted map of electronic density of a molecule, and an X-ray photograph of its three-dimensional model.

The disclosed three-dimensional model can be also employed for enhancing the accuracy of X-ray structural analysis of molecular structures in comparing an X-ray photograph of the model with an electronic densitogram 11 (FIG. 6) of the density of the molecule.

Thus, the herein disclosed invention provides for creating a model of a molecular structure, having the merits of both a three-dimensional model and a skeleton model. The invention allows for attaining higher accuracy in determining the atomic coordinates and the directions of the imitated chemical bonds. The disclosed models enable to avoid eventual distortions of Van der Waals' and covalent radii, and of valence angles. The field of applications of three-dimensional models has been substantially broadened, the models being now usable in conducting scientific studies and research in crystallography, molecular biology and other scientific areas, in investigating the structure and structural changes of chemical compounds and substances.

INDUSTRIAL APPLICABILITY

The invention can be utilized in scientific research and training centres for affording spatial comprehension of the molecular structures of substances and their changes. The invention can be also used for decoding and interpreting initial data obtained by crystallographic studies of chemical compounds, and also for identifying their most probable structural states.

I claim:

1. A three-dimensional model of a molecular structure, comprising plastic modules (1) imitating each one atom of the molecular structure being modeled, interconnected by connecting members (2) of a cylindrical shape, receivable in the sockets (5) of each module, the shape of these sockets (5) complementing the shape of the connecting member (2), characterized in that each plastic module (1) has arranged centrally thereof an element (6) shaped as a sphere or a part of a sphere, and each connecting member (2) includes an insert (7) extending axially thereof, the spherical element (6) and the insert (7) being made of an X-ray contrast material to produce on an X-ray photograph of the model the images (9,10) of the centres of the plastic modules and representing of the chemical bonds of the modeled molecular structure.

* * * * *